United States Patent [19]

Bertrand

[11] Patent Number: 5,078,797
[45] Date of Patent: Jan. 7, 1992

[54] PROCESS FOR OBTAINING A PLATE OF ZR ALLOY COMPRISING A PORTION OF EXCESS THICKNESS AND ITS USE

[75] Inventor: Jean-Claude Bertrand, Rugles, France

[73] Assignee: Compagnie Europeenne Du Zirconium Cezus, Courbevoie, France

[21] Appl. No.: 627,047

[22] Filed: Dec. 13, 1990

[30] Foreign Application Priority Data

Dec. 20, 1989 [FR] France .................. 89 17539

[51] Int. Cl.$^5$ .............. B05D 3/10; B44C 1/22; B08B 3/08
[52] U.S. Cl. ........................ 134/3; 134/25.4; 134/28; 134/41; 156/659.1; 156/664; 252/79.3; 252/79.4; 427/275
[58] Field of Search .......... 134/28, 3, 41, 25.4; 156/659.1, 664; 252/79.3, 79.4; 427/275

[56] References Cited

U.S. PATENT DOCUMENTS

2,517,430  8/1950  Hensel et al. .................. 427/275

FOREIGN PATENT DOCUMENTS

0254539  7/1986  European Pat. Off. .

*Primary Examiner*—Theodore Morris
*Assistant Examiner*—Zeinab El-Arini
*Attorney, Agent, or Firm*—Dennison, Meserole, Pollack & Scheiner

[57] ABSTRACT

A process for obtaining a plate of zirconium alloy comprising at least one portion of excess thickness of at least 0.5 mm relative to a large adjacent face, the portion having edges with angles equal to 90° to 105° and flanks which are connected without depressions to the large adjacent faces. According to the process, a surface portion of a blank plate located straight above a desired portion of excess thickness is coated with a continuous coating which is resistant to a pickling composition to be used, the coated portion widened beyond the desired portion of excess thickness by 0.5–1.5 times the amount of the excess thickness. The coated blank plate is immersed a plurality of times, without passage of electric current, in a pickling bath comprising HF, an oxidizing agent and water, and having a dissolved Zr content less than 12 g/l and a temperature below 35° C. Each immersion removes less than 0.3 mm of thickness over the portions of the blank plate which are not coated. Subsequently, the coating is removed and the blank plate is immersed in the pickling bath for a final treatment. This process can be employed for the preparation of plates of great length which are to be folded, each portion of excess thickness being placed inside a folded angle, in particular to form boxes for ducts for the circulation of fluids.

8 Claims, 2 Drawing Sheets

PROCESS FOR OBTAINING A PLATE OF ZR ALLOY COMPRISING A PORTION OF EXCESS THICKNESS AND ITS USE

The invention relates to a process for the chemical pickling of a Zr alloy plate which allows a calibrated excess thickness without geometric defects such as a cutting edge or hollow parts to be obtained on this plate.

Such pickling can also be designated as chemical machining.

The document EP-A-O 254 539 gives teaching about the behaviour of baths based on hydrofluoric acid and nitric acid for the pickling of Zr or alloy products. A bath containing 3% by weight of HF and 15% by weight of $HNO_3$ appears to be exhausted when it contains 24 g/l of Zr.

This document does not manage to solve the problem posed, which is to obtain plates which are typically 3 to 5 m long and have a total thickness of 2 to 3 mm and each have one or two portions of selected excess thickness of at least 0.5 mm relative to one of its large faces, this portion or these portions comprising edges having, in cross section, an angle of 90° or slightly greater than 90°, the flanks following these edges being connected to the large adjacent faces without comprising depressions. Such plates cannot be obtained satisfactorily by mechanical machining, in particular because it introduces residual stresses and defective flatness.

A satisfactory solution to this problem according to the invention involves, after having prepared a blank plate having a thickness greater than the final total thickness or final thickness of the portion of excess thickness to be obtained, proceeding with the following successive stages:

a) a surface part of said blank plate located plumb with said portion of excess thickness to be obtained and widened by 0.5 times to 1.5 times said excess thickness along each thinner adjacent portion to be obtained, is coated with a continuous coating which is resistant to the pickling treatment employed in (b);

b) the blank plate coated in this way is chemically pickled without passage of electric current by several immersions in a pickling bath, this pickling bath being based on HF, oxidising agent and water, with a dissolved Zr content of less than 12 g/l and preferably 6 g/l and being below 35° C., each of said immersions removing less than 0.3 mm of thickness over the uncoated portion of the plate;

c) the coating is removed completely, and the stripped plate is subjected to a final pickling treatment.

Each portion of excess thickness obtained by this process must have a specific width in its upper portion, typically better than ±0.5 mm, a specific position over the width of the plate, usually within 0.5 mm relative to a large edge of this plate, and an excess thickness or height relative to the thinner adjacent portions typically fixed within 0.08 mm. Tests have shown that three different types of defects could be obtained: cavities in the flanks of the portion of excess thickness beneath its top which was coated; cavities in the connection of these flanks to the thinner adjacent portions, these cavities forming types of troughs; and a width and/or position of the portion of excess thickness outside the fixed tolerances. As a consequence of the first defect of a cavity in the flanks during pickling, a blade or ridge shaped portion which becomes thinner and of which the point is located beneath the edge of the coating is obtained, in practice, beneath each longitudinal border of the coating. The edge of such a pointed portion is sharp and can cause injury, which is unacceptable both with regard to handling and with regard to the strength and good definition of the portion of excess thickness during shaping treatments and in service. All these defects are produced with a facies and a size which are particular to zirconium alloys, for example zircaloy 2 and 4. It has been found that such defects can be avoided by the following essential methods:

limiting the temperature and the dissolved Zr concentration of the pickling bath used so as to regulate the attack, and limiting the extent of unit immersion or pickling treatments to avoid localised heating relative to these objectives; it is preferable to maintain stirring of the bath, for example by blowing in air, or to avoid localised heating by pickling by sprinkling in the course of travel;

initially coating the surface part of the blank plate corresponding to the portion of excess thickness to be obtained while widening it by a quantity depending on this excess thickness so as to obtain, on each edge of said portion at the end of the pickling treatment with coating, a small defective portion of controlled size, the following pickling treatment without coating allowing this fine ridge to be dissolved and then allowing the remaining ridge to be softened.

The pickling bath used preferably contains 1 to 4% by weight of hydrofluoric acid (HF) and 10 to 30% of nitric acid ($HNO_3$), and the bath temperature is preferably between 18° and 30° C.

According to a first procedure, pickling is carried out by shaping, beneath the coating, fairly wide thinned ridges, a part is then revealed and pickling is continued to dissolve the majority of the preceding thinned ridges or "points", before the remainder of the coating is removed and final pickling is carried out to complete the softening of the ridges of the portion of excess thickness obtained, if necessary. The particular conditions are as follows: the coating applied before the beginning of the pickling treatment comprises a widening of 1 to 1.5 times the excess thickness along each thinner adjacent portion to be obtained; pickling is then stopped when the remaining thickness to be removed on the adjacent portions of the plate is between 0.1 and 0.35 mm, and a width of 0.3 to 0.8 mm of the border of the coating is removed along each adjacent portion; the pickling treatment (b) is then carried out beneath the coating. This first procedure allows satisfactory portions of excess thickness to be obtained with the necessary stages and conditions mentioned at the outset. However, the removal of a small width (0.3 to 0.8 mm) on each side of the coating is an awkward matter.

The applicants have found that such intermediate unmasking or removal of coating can be avoided by adopting the following particular conditions, defining a second procedure:

widening of the coating is limited to 0.5 to 1 times the excess thickness along each thinner adjacent portion to be obtained;

the pickling bath has a dissolved Zr content which is kept below 6 g/l and it contains a surfactant;

each immersion of the pickling treatment beneath coating (b) removes less than 0.25 mm of thickness on the uncoated portions of the plate and this pickling treatment (b) is continued until 0.02 to 0.1 mm of thickness remains to be removed by the final pickling treatment (c) on the uncoated portions of the plate.

The presence of a surfactant plays an important part in the evenness of the pickling treatment and in limiting its cavities. The final pickling treatment after removal of the coating removes the complement, that is 0.02 to 0.1 mm of thickness.

The foregoing conditions are preferably specified as follows:

said pickling bath contains 1.5 to 3% by weight of HF, 10 to 25% of $HNO_3$, 7 to 150 g/1000 l of powdered surfactant and an anti-foaming agent, and is kept between 20° and 30° C.;

the pickling treatment (b) is continued until 0.02 to 0.05 mm of thickness remains to be removed on said uncoated portions.

To achieve better results, fairly large quantities of surfactant are preferred but this creates a foam which is undesirable for the operations unless an anti-foaming agent is also added.

As the plates to be treated are several meters long, it has been found particularly advantageous, for the evenness of this machining by pickling in the longitudinal direction, to carry out the immersions of the pickling treatment during travel, at least for phase (b) of pickling beneath the coating, the large faces of the plate being vertical and the pickling bath being sprayed with atomisation on these faces. The plates are preferably turned back between the passes of the pickling treatment.

The invention also relates to the use of the process described for the production of a plate having a length of 3 to 5 m and a total thickness of 2 to 3 mm, this plate bearing one to four longitudinal portions of excess thickness typically comprised between 0.6 and 1.3 mm relative to a large face and having to be folded transversely at right angles; each portion of excess thickness being placed inside such an angle. A significant advantage of the process of the invention is that it maintains the planeness of the face toward the treated plate, the employed method of machining by pickling not introducing internal stresses.

EXAMPLES AND TESTS

FIGS. 4 to 7 are copies of micrographs in a magnification of 32.

1. First Test

Figure 1:
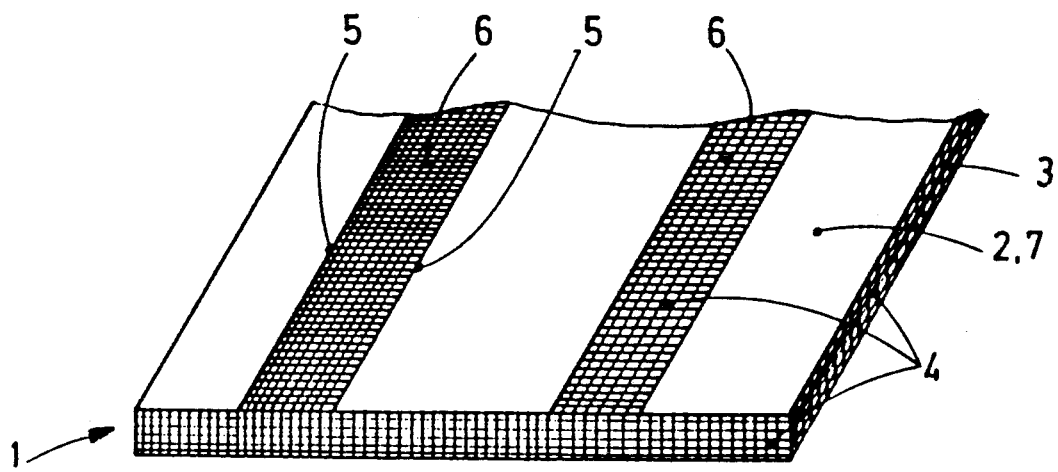
FIG. 1 shows, in an isometric projection, a blank plate partially coated prior to machining by pickling.

A degreased blank plate 1 of Zircaloy 4 measuring 267 mm wide $\times$ 2.53 mm thick $\times$ 2 m long is used as a starting material. It has been coated over a large face 2 and over its lateral edges or borders 3 with a masking paint 4 known as "TURCO MASK - 5580 GMD" made by TURCO FRANCE. This paint was allowed to dry so as to form a thin film 4 adhering to the plate 1, and the longitudinal limits 5 of respective clearances 33 mm of two portions of excess thickness 6 to be obtained with a height of 0.9 mm relative to the adjacent portions such as 7 havebeen marked. These portions 7 have then been stripped by peeling (FIG. 1).

Figure 2:
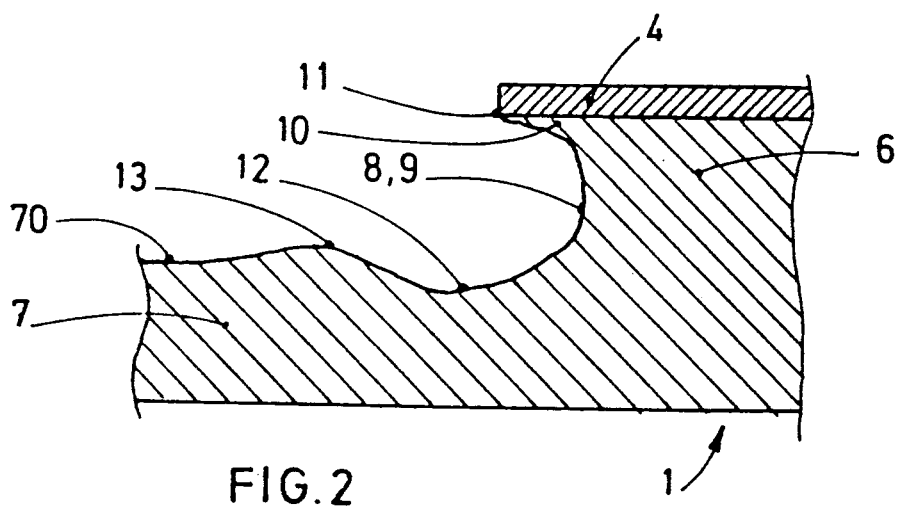
FIG. 2 shows, in section, a portion of excess thickness which is obtained by pickling of the previous blank plate in a single immersion treatment.

This blank plate 1 was then plunged into a fluonitric pickling bath, that is to say based on hydrofluoric acid (HF), nitric acid ($HNO_3$) and water and having the composition:

2% by weight of HF, 17.5% by weight of $HNO_3$, reminder water, and pickling was carried out, the large faces of the plate being vertical, until the thickness of the uncoated portions of the plate 7 (FIG. 1) reaches 1.63 to 1.65 mm. The stoppage of pickling was regulated according to several checks of thickness of a part of the plate briefly raised outside the bath during each of these checks. The plate 1 pickled and rinsed in this way has large defects 8 to 11, shown in FIG. 2, the coating 4 still being in position. The flank 8 of the portion of excess thickness 6 comprises a large cavity 9 ending at its upper part with a blade or ridge 10 which thins to a point 11 beneath the border of the coating 4. This large blade 10 could not be eliminated by the final pickling treatment, which removed only 0.03 to 0.04 mm over the total thickness which would have to be achieved after removal of the coating 4. The point 11 can cause injury and is fragile, so is unacceptable for use which normally involves handling, shaping, and use in water hotter than 300° C. Below the cavity 9, a trough-shaped cavity 12 can be seen, marking the connection of the portion 6 to the thinner adjacent portion 7 not coated during the pickling treatment. The external edge of the trough 12 is marked by a swelling 13 forming a type of mound 13 relative to the cavity 12 and the surface 70 of the remainder of the portion 7 escaping from these anomalies of pickling 9 to 13.

A large quantity of reddish brown fumes (nitrous vapour) was observed during the pickling treatment, the temperature of the bath having risen above 40°. The two portions of excess thickness 7 obtained therefore have unacceptable defects 9 to 13, and their widths after the final pickling treatment will be poorly defined.

2. Second Test

Figure 3:
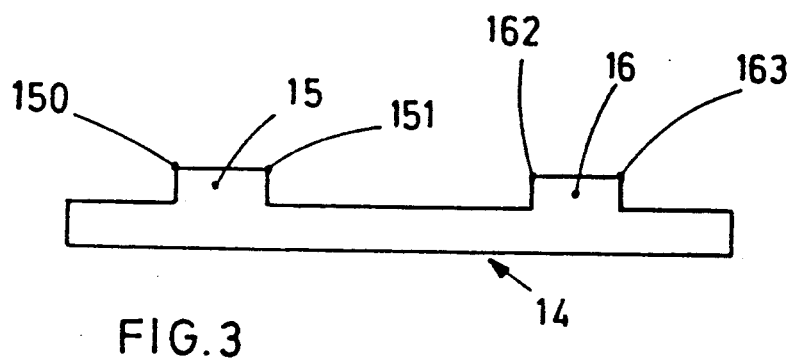
FIG. 3 shows the contour, in section, of a test plate in its geometry after pickling, its two portions of excess thickness having been pickled with variations.

A different blank plate 14 of Zircaloy 4, having the same cross section as the plate 1 and the same length, was used. The coating of the future portions of excess thickness 15 and 16 (FIG. 3) was prepared in the same manner as in the first test, the width of the coating of each future portion of excess thickness 15 or 16 being 36 mm. The initial composition of the pickling bath was:

2% by weight of HF, 17.5% by weight of $HNO_3$, 7 g/l of dissolved Zr, remainder water.

The pickling device was a machine producing a constant flow rate of pickling bath atomised onto the vertical faces of the plate, the plate being entrained at constant speed between the atomising bases.

The pickling treatment (b) carried out on the test plate 14 coated in this way was carried out by means of this machine and of the previous bath recycled by the machine (total volume of bath = 1000 l) in six passes with turning of the plate, end for end then face for face, between the pickling passes. The edges 151 and 162, 163 of the portions of excess thickness to be obtained 15 and 16 (FIG. 3) were stripped over 0.5 mm of width during the intermediate stages of this pickling treatment by cutting and peeling of a 0.5 mm wide border of the corresponding coating:

the edge 151 was thus stripped between the second and third pickling pass;

the edge 162 between the third and fourth pickling pass;

and the edge 163 between the fourth and fifth pickling pass.

The coating of the external edge 150 of the portion 15 was not modified during this pickling treatment (b).

Successive pickling treatments carried out by means of these six passes are summarised in Table 1. The orientation of the plate 14 during each pass is marked by the position of the marking of the plate, located at the top or at the bottom (T or B) and at the front or at the rear (F or R) of this plate entrained between the atomising nozzles of the bath, such that the operator sees it. The temperature remained between 23° and 28° C., the dissolved Zr concentration of the bath rose to 9 g/l at the end of this pickling treatment (b) which must be followed, after rinsing, drying and removal of the coating remaining on the plate, by a final pickling treatment of 0.03 mm over the thickness.

TABLE 1

| Pass No. | Plate orien- tation | Thickness after, uncoated portion (mm) | Speed of travel of the plate (m/min) | Thickness removed (mm) pass | Thickness removed (mm) cumu- lative | Thickness still to be removed (mm) |
|---|---|---|---|---|---|---|
| 1 | T , F | 2.35 | 0.5 | 0.18 | 0.18 | 0.65 |
| 2 | B , R | 2.17 | " | 0.18 | 0.36 | 0.47 |
| 3 | B , F | 1.99 | " | 0.18 | 0.54 | 0.29 |
| 4 | T , R | 1.87 | " | 0.12 | 0.66 | 0.17 |
| 5 | T , F | 1.76 | " | 0.11 | 0.77 | 0.06 |
| 6 | B , R | 1.70 | 1 | 0.06 | 0.83 | 0.00 |

Figure 4:
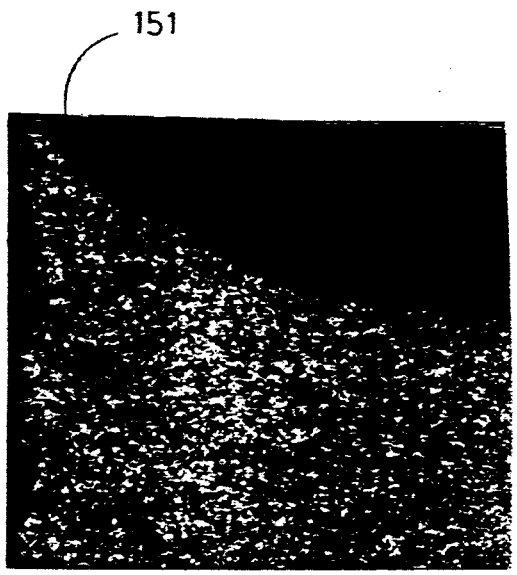
FIG. 4 shows, in section, a first edge of a portion of excess thickness of the previous plate.
Figure 5:
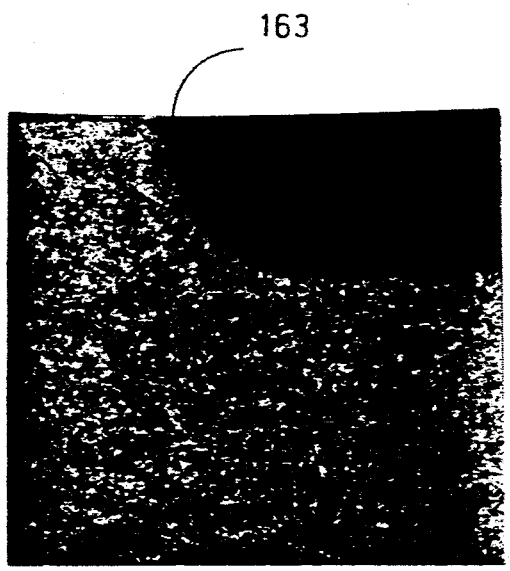
FIG. 5 shows, in section, a second edge belonging to the second portion of excess thickness of the previous plate.

The coatings were removed and the profile of the portions of excess thickness 15 and 16 was examined in a cross section:

the edge 150 which has been subjected to the entire pickling treatment beneath its initial coating comprises a blade or ridge having a width of 0.1 mm and a mean thickness of 0.05 mm, this ridge thinning into an extreme point and, beneath it a slight subjacent flank cavity connected to the thinner adjacent portion. These defects are less marked than those of the plate 1, but still unacceptable;

the edge 151, stripped over 0.5 mm after a pickling treatment of 0.36 mm over the thickness and before a complement of pickling of 0.47 mm over the thickness still comprises (FIG. 4 on a magnification of 32) a small blade ending with a point which is less tapered than that of the ridge 150 and has a width of 0.05 mm, a slight cavity in the flank beneath this small blade and a slight cavity in the connection between the portion of excess thickness 15 (FIG. 3) and the thinner adjacent portion. The interpretation is that the point portion has dissolved over 0.5 mm of width, then a new cavity has been formed in the flank due to the extent of the remaining pickling treatment;

the edge 162, travelling over 0.5 mm after pickling of 0.54 mm over the thickness and before a complement of pickling of 0.29 mm over the thickness, does not have a ridge which is thinner at the point, but the subjacent flank has slight cavities, like that of the ridge 151;

the edge 163 (FIG. 5), stripped over 0.5 mm after pickling of 0.66 mm over the thickness and before a complement of pickling of 0.17 mm over the thickness, does not have undesirable roughness, and the angle between the underside of the portion of excess thickness 16 and the flank of this portion, or edge angle, is 100° here, and this is acceptable. The width of the portion of excess thickness 16 obtained was 33.8 mm, that is 2 times 1.1 mm less than the initial width of the coating or again 2 times the product of the thickness pickled in (b) or excess thickness of the portion 16 (0.83 mm) by 1.33.

As a conclusion to this test, for the pickling bath and the procedure employed, partial stripping allows a good result to be achieved if it is carried out before complementary pickling of at least 0.1 mm to dissolve the roughness of the ridge present at this stage and to obtain a well-connected flank, this pickling treatment being at most 0.35 mm to avoid secondary cavities. The other tests carried out have demonstrated that improved, more uniform results could be obtained with this procedure by limiting the concentration of dissolved Zr to less than 6 g/l and and/or by introducing a surfactant into the bath.

3. Third Test

A third blank plate of Zircaloy 4 having the same cross section as the previous plates 1 and 14, but a length of 4.2 m, was used, and its future portions of excess thickness were coated in the same manner and with the same paint as before, the width of each coating being 34.5 mm. No partial removal of the border of these coatings was carried out, and the pickling conditions were as follows, the thickness of the plate being 2.58 mm before the pickling treatment (Table 2).

TABLE 2

| pass No. | Plate orientation Position of the marking | Thickness after uncoated portion (mm) | Speed of travel of the plate (m/min) | Thickness removed (mm) pass | Thickness removed (mm) cumu- lative |
|---|---|---|---|---|---|
| 1 | T , F | 2.41 | 0.5 | 0.17 | 0.17 |
| 2 | B , R | 2.30 | " | 0.11 | 0.28 |
| 3 | B , F | 2.19 | " | 0.11 | 0.39 |
| 4 | T , R | 2.10 | 0.7 | 0.09 | 0.48 |
| partial renewal of the bath | | | | | |
| 5 | T , F | 1.87 | 0.5 | 0.23 | 0.71 |
| 6 | B , R | 1.78 | 1 | 0.09 | 0.80 |
| 7 | B , F | 1.69 | 1 | 0.09 | 0.89 |

1,000 l of fresh bath containing 2% by weight of HF, 20% by weight of $HNO_3$, 50 g of surfactant designated SYPON-LC 598 produced by UGINE KUHLMANN, and water were used at the beginning of this pickling treatment in a machine. The dissolved Zr concentration of this bath was 3.2 g/l at the end of the first four passes. 400 l of this bath were then removed and were replaced by 400 l of fresh bath, thus bringing the Zr concentration back to 1.9 g/l and, at the end of the pickling treatment, producing a final Zr concentration of 2.7 g/l. The bath temperature varied between 23° and 27° C. The thickness removed per pass was always less than 2.25 mm.

Figure 6:
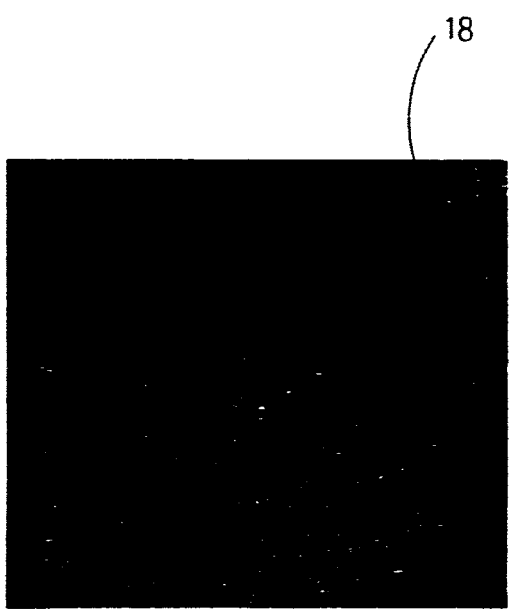
FIGS. 6 and 7 show, in section, two edges of the portions of excess thickness of a second test plate which is pickled according to the second procedure of the invention.
Figure 7:
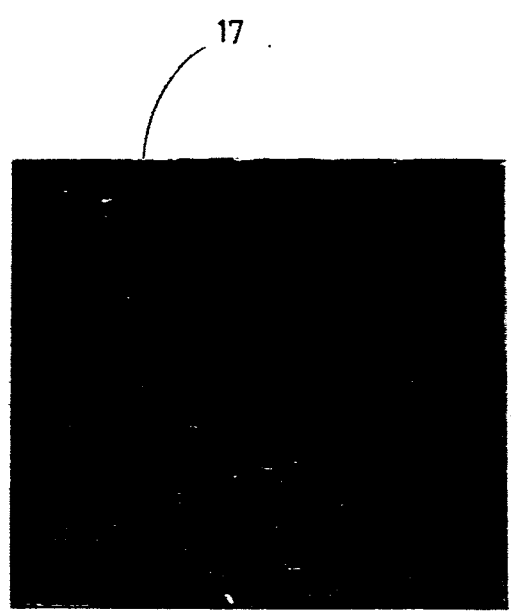

Two excess lengths at the end of this plate were examined after micrographic preparation of their sections perpendicular to the longitudinal direction of this plate. FIGS. 6 and 7 show two representative aspects thereof, on a magnification of 32 as before. The coatings were removed and a final pickling treatment of 0.02 to 0.03 mm over the thickness is still to be carried out.

The edge 17 (FIG. 7) is turned toward the external edge of the plate, its profile is satisfactory and the edge angle is 94°.

The edge 18 (FIG. 6) is turned toward the interior of the plate, that is to say toward the other portion of excess thickness of this plate. It comprises a slight cavity in the flank, having a depth of 0.06 mm, beneath its pointed end. The part projecting from this edge has a width equal to this depth. This unacceptable defect can be eliminated, in particular by doubling the concentration of surfactant, and also an anti-foaming agent, the foam otherwise interfering.

The width of the portion of excess thickness contained between the ridges 17 and 18 is 33.4 mm, which is smaller than that of the initial coating (34.5 mm), and this is surprising and is linked to the complexity of the procedure of machining by pickling, equivalent here to slight hollowing followed by levelling.

APPLICATION

The plates obtained by the process according to the invention are, in particular, folded and welded to form boxes or ducts for the circulation of fluid, typically in energy-producing reactors.

I claim:

1. Process for obtaining a plate of Zr alloy comprising at least one portion of excess thickness of at least 0.5 mm relative to a large face of said plate, from a blank plate having a thickness greater than the final thickness of said portion of excess thickness, comprising the steps of:
   a) coating a surface portion of said blank plate located straight above a desired portion of excess thickness and widened beyond said desired portion by 0.5–1.5 times the amount of the excess thickness, over the portions adjacent said plate portion, with a continuous coating which is resistant to a pickling bath to be used;
   b) immersing said coated blank plate a plurality of times, without passage of electric current, in a pickling bath comprising HF, an oxidizing agent, and water, and having a dissolved Zr content less than 12 g/l and a temperature below 35° C., each said immersion removing less than 0.3 mm of thickness over portions of said blank plate which are not coated; and subsequently,
   c) completely removing said coating and immersing said blank plate in said pickling bath for a final treatment to obtain said plate having at least one portion of excess thickness,
   said portion of excess thickness having edges with angles of, in cross-section, 90° to 105°, and flanks which are connected without depressions to adjacent large faces.

2. Process according to claim 1, in which the pickling bath contains:
   1 to 4% by weight of HF
   10 to 30% by weight of $HNO_3$,
   this bath being kept between 18° and 30° C.

3. Process according to claim 1 or 2, in which said coating (4) comprises a widening of 1 to 1.5 times the amount of said excess thickness along each said adjacent portion, and in which a border width of 0.3 to 0.8 mm of said coating (4) is removed during said step of immersing along each said adjacent portion (7) while the thickness remaining to be removed over said adjacent portions (7) is between 0.1 and 0.35 mm, said immersing then being carried out.

4. Process according to claim 3, in which the pickling bath contains a surfactant.

5. Process according to claim 2, in which:
   said coating (4) comprises a widening of 0.5 to 1 times the amount of said excess thickness along each said adjacent portion;
   said pickling bath has a dissolved Zr content of less than 6 g/l and contains a surfactant;
   each immersion of the pickling treatment (b) removes less than 0.25 mm of thickness over the uncoated portions (7) of the plate (1; 14), and this pickling treatment (b) is carried out until 0.02 to 0.1 mm of thickness remains to be removed by the final treatment over said uncoated portions (7).

6. Process according to claim 5, in which:
   said pickling bath contains 1.5 to 3% by weight of HF, 10 to 25% by weight of $HNO_3$, 70 to 150 g/1000 l of powdered surfactant and an anti-foaming agent, and is kept at between 20° and 30° C.;
   said step of immersing is carried out until 0.02 to 0.05 mm of thickness remains to be removed over said uncoated portions (7).

7. Process according to claim 1, 2, 3, 4, 5 or 6, in which the immersions in the pickling bath are carried out during travel, large faces of the plate (14) are vertical and the pickling bath is sprayed by atomization on said faces.

8. Process according to claim 1, 2, 3, 4, 5 or 6 for the production of a plate (14) having a length of 3 to 5 m and a total thickness of 2 to 3 mm, this plate bearing one to four longitudinal portions (15, 16) of excess thickness of 0.6 to 1.3 mm relative to one of its large faces and which is folded transversely at right angles, each portion of excess thickness (15, 16) being placed inside such an angle.

* * * * *